US012578442B2

(12) United States Patent
Bennington et al.

(10) Patent No.: US 12,578,442 B2
(45) Date of Patent: Mar. 17, 2026

(54) MULTI-DETECTOR LIDAR SYSTEMS AND METHODS FOR MITIGATING RANGE ALIASING

(71) Applicant: LG INNOTEK CO., LTD., Seoul (KR)

(72) Inventors: Dane P. Bennington, Pittsburgh, PA (US); Ryan T. Davis, Woodside, CA (US); Michel H.J. Laverne, Pittsburgh, PA (US)

(73) Assignee: LG INNOTEK CO., LTD., Seoul (KR)

( * ) Notice: Subject to any disclaimer, the term of this patent is extended or adjusted under 35 U.S.C. 154(b) by 280 days.

(21) Appl. No.: 18/485,885

(22) Filed: Oct. 12, 2023

(65) Prior Publication Data

US 2024/0036177 A1 Feb. 1, 2024

Related U.S. Application Data

(63) Continuation of application No. 17/070,765, filed on Oct. 14, 2020, now Pat. No. 11,822,018.

(51) Int. Cl.
| | |
|---|---|
| *G01S 7/4863* | (2020.01) |
| *G01S 7/489* | (2006.01) |
| *G01S 17/00* | (2020.01) |
| *G01S 17/931* | (2020.01) |

(52) U.S. Cl.
CPC ........... *G01S 7/489* (2013.01); *G01S 7/4863* (2013.01); *G01S 17/003* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,028,998 | A | 7/1991 | Westell |
| 9,109,886 | B1 | 8/2015 | Haskin et al. |
| 10,656,275 | B1 | 5/2020 | Bills et al. |
| 2011/0235771 | A1 | 9/2011 | Aull et al. |
| 2012/0169909 | A1 | 7/2012 | Rysinski et al. |
| 2012/0274937 | A1 | 11/2012 | Hays et al. |
| 2015/0253428 | A1 | 9/2015 | Holz |

(Continued)

FOREIGN PATENT DOCUMENTS

| | | |
|---|---|---|
| CN | 110073238 A | 7/2019 |
| WO | WO 2019/064062 A1 | 4/2019 |

OTHER PUBLICATIONS

U.S. Office Action for U.S. Appl. No. 17/070,414, dated May 14, 2025.

(Continued)

*Primary Examiner* — Eric L Bolda
(74) *Attorney, Agent, or Firm* — Birch, Stewart, Kolasch & Birch, LLP

(57) ABSTRACT

A method including emitting, by a light emitter, a first light pulse at a first time; activating a first light detector and a second light detector with different fields of view, emitting, by the light emitter, a second light pulse at a second time; receiving return light by the first light detector or the second light detector at a third time; and determining, based on the return light being detected by the first light detector or the second light detector, whether the return light is based on the first light pulse or the second light pulse when the first light pulse and second light pulse are simultaneously traversing an environment for a period of time.

20 Claims, 8 Drawing Sheets

(56) References Cited

U.S. PATENT DOCUMENTS

| | | | |
|---|---|---|---|
| 2016/0205378 | A1 | 7/2016 | Nevet et al. |
| 2016/0238698 | A1 | 8/2016 | Vuorenkoski-Dalgleish et al. |
| 2016/0291594 | A1 | 10/2016 | Zhao et al. |
| 2017/0097263 | A1 | 4/2017 | Williams |
| 2017/0097417 | A1 | 4/2017 | Wang |
| 2017/0176575 | A1 | 6/2017 | Smits |
| 2017/0176577 | A1 | 6/2017 | Halliday |
| 2018/0069367 | A1 | 3/2018 | Villeneuve et al. |
| 2018/0231645 | A1 | 8/2018 | Droz et al. |
| 2018/0292532 | A1 | 10/2018 | Meyers et al. |
| 2018/0348347 | A1 | 12/2018 | Xue et al. |
| 2019/0086518 | A1 | 3/2019 | Hallstig et al. |
| 2019/0146071 | A1 | 5/2019 | Donovan |
| 2019/0250257 | A1 | 8/2019 | Finkelstein et al. |
| 2019/0339389 | A1 | 11/2019 | Russo et al. |
| 2020/0158838 | A1 | 5/2020 | Henderson et al. |

OTHER PUBLICATIONS

Williams Jr., George M. "Optimization of Eyesafe Avalanche Photodiode LiDar for Automobile Safety and Autonomous Navigation Systems", Optical Engineering, Mar. 28, 2017, pp. 1-10, vol. 56, issue 3, SPIE, Bellingham, Washington, US.
U.S. Office Action for U.S. Appl. No. 17/070,414, dated Dec. 10, 2025.
Chinese Office Action for Chinese Application No. 202180084273. 7, dated Jan. 21, 2026, with English translation.

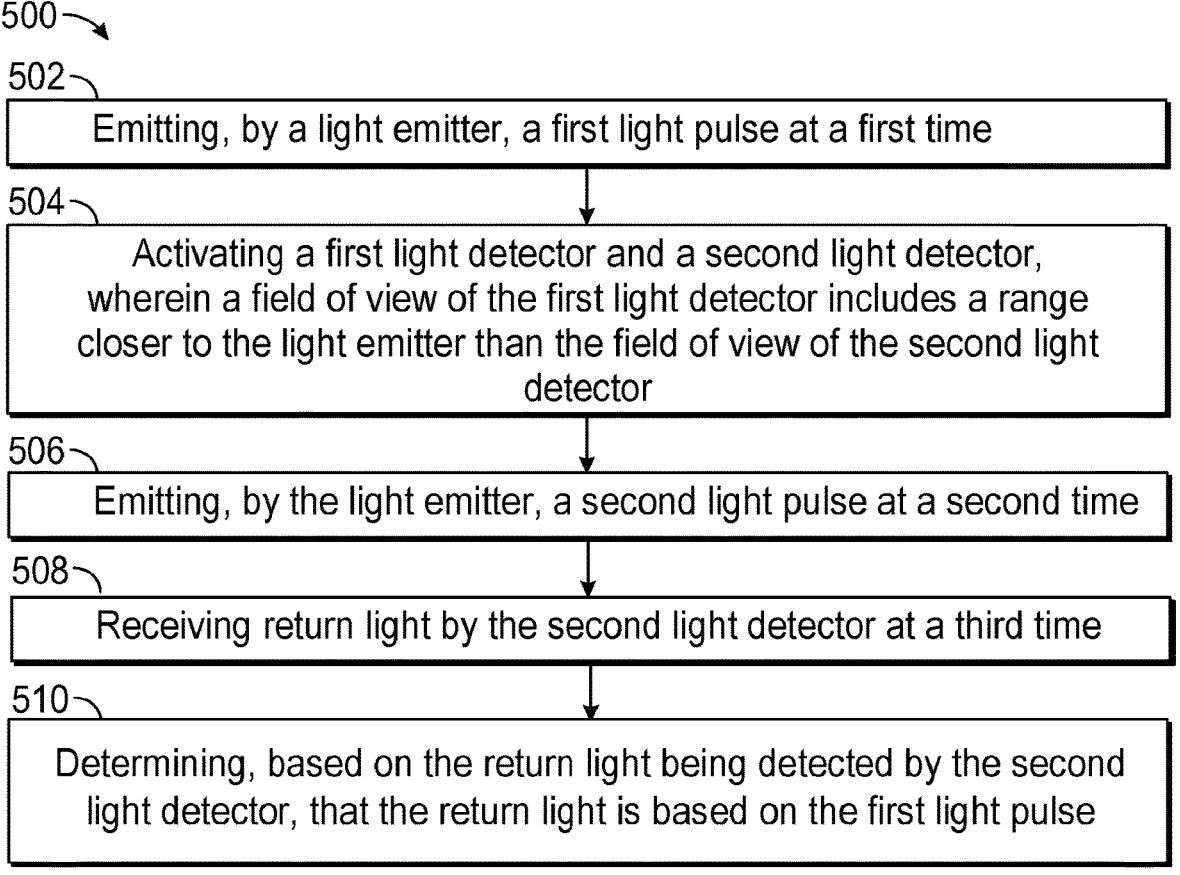

500

502
Emitting, by a light emitter, a first light pulse at a first time

504
Activating a first light detector and a second light detector, wherein a field of view of the first light detector includes a range closer to the light emitter than the field of view of the second light detector 506
Emitting, by the light emitter, a second light pulse at a second time 508
Receiving return light by the second light detector at a third time 510
Determining, based on the return light being detected by the second light detector, that the return light is based on the first light pulse

MULTI-DETECTOR LIDAR SYSTEMS AND METHODS FOR MITIGATING RANGE ALIASING

CROSS-REFERENCE TO RELATED APPLICATIONS

This application is a continuation of U.S. application Ser. No. 17/070,765, filed on Oct. 14, 2020, which is incorporated by reference into the present application.

BACKGROUND

In some LIDAR systems (for example, bistatic LIDAR systems that use a single receiver to detect light emitted by a single emitter), the emitter used to emit light into the environment and the receiver used to detect return light reflecting from objects in the environment are physically displaced relative to each other. Such LIDAR configurations may inherently be associated with parallax problems because the light emitted by the emitter and received by the detector may not travel along parallel paths. For example, for a LIDAR system designed to operate at very short distances (for example, at a distance of 0.1 meters), the emitter and receiver may need to be physically tilted towards each other (as opposed to aligning them at infinity distance). However, this physical tilting may result in a loss of detection capabilities at long ranges from the LIDAR system. To address this, and to have the capability to handle both short and long-range detections, some LIDAR systems may use a combination of a wide field of view and the aforementioned tilted assembly. This wide field of view, however, may result in another set of problems, including increasing the amount of background light detected by the receiver without increasing the amount of light emitted by the emitter, which may significantly increase the signal to noise ratio of the receiver.

Additionally, the use of the single receiver for the emitter (or even an array of receivers pointed in a common direction) can lead to other problems as well, such as difficulties in addressing range aliasing and cross-talk concerns. Range aliasing may arise when multiple light pulses are emitted by an emitter and are traversing the environment at the same time. When this is the case, the LIDAR system may have difficulty ascertaining which emitted light pulse the detected return light originated from. To provide an example, the emitter emits a first light pulse at a first time and then emits a second light pulse at a second time before return light from the first light pulse is detected by the receiver. Thus, both the first light pulse and the second light pulse are traversing the environment simultaneously. Subsequently, the receiver may detect a return light pulse a short amount of time after the second light pulse is emitted. However, the LIDAR system may have difficulty determining whether the return light is indicative of a short range reflection based on the second light pulse or a long range reflection based on the first light pulse. Cross-talk concerns may arise based on a similar scenario, but instead of detecting return light from a first light pulse emitted by the same emitter, the receiver from the LIDAR system may instead detect a second light pulse that originates from an emitter of another LIDAR system. In this scenario, the LIDAR system may mistake the detected second light pulse from the other LIDAR system as return light originating from the first light pulse. Similar to range aliasing, this may cause the LIDAR system to mistakenly believe that a short range object is reflecting light back towards the LIDAR system.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 5 depicts an example method, in accordance with one or more example embodiments of the disclosure.

DETAILED DESCRIPTION

Overview

Figure 1:
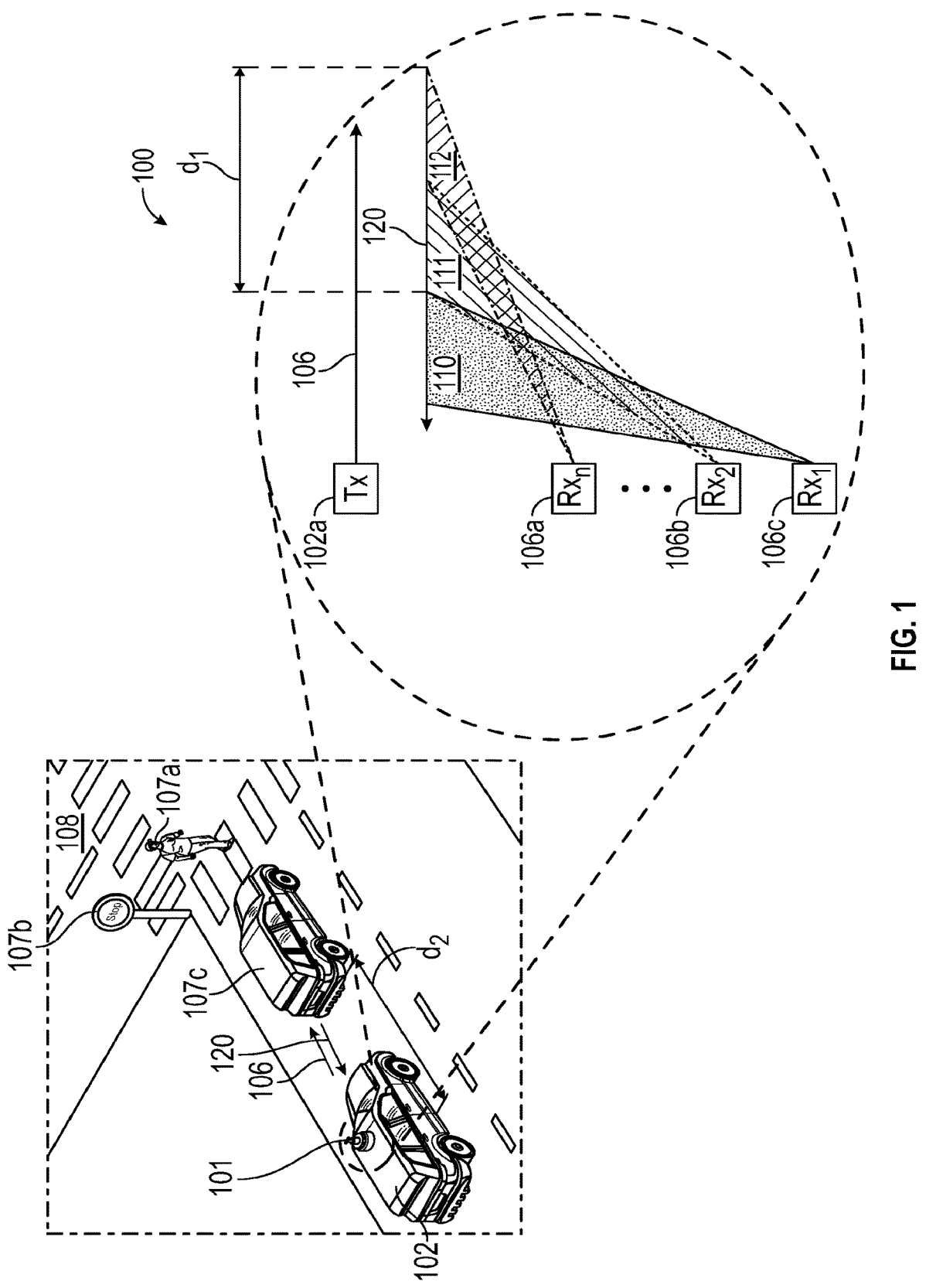
FIG. 1 depicts an example system, in accordance with one or more example embodiments of the disclosure.

This disclosure relates to, among other things, multi-detector LIDAR systems and methods (the LIDAR detectors may be referred to as "receivers," "photodetectors," "photodiodes," or the like herein. Additionally, reference may be made herein to a single "photodetector" or "photodiode," but the LIDAR systems described herein may also similarly include any number of such detectors). In some instances, the detectors may be photodiodes, which may be diodes that are capable of converting incoming light photons into an electrical signal (for example, an electrical current). The detectors may be implemented in a LIDAR system that may emit light into an environment and may subsequently detect any light returning to the LIDAR system (for example, through the emitted light reflecting from an object in the environment) using the detectors. As one example implementation, the LIDAR system may be implemented in a vehicle (for example, autonomous vehicle, semi-autonomous vehicle, or any other type of vehicle), however the LIDAR system may be implemented in other contexts as well. The detectors may also more specifically be Avalanche Photodiodes (APD), which may function in the same manner as a normal photodiode, but may operate with an internal gain as well. Consequentially, an APD that receives the same number of incoming photons as a normal photodiode will produce a much greater resulting electrical signal through an "avalanching" of electrons, which allows the APD to be more sensitive to smaller numbers of incoming photons than a normal photodiode. An APD may also operate in Geiger Mode, which may significantly increase the internal gain of the APD.

As aforementioned, bistatic LIDAR systems may include emitters and receivers that are physically displaced relative to one another. Such LIDAR configurations may inherently be associated with parallax problems because the light emitted by the emitter and received by the detector may not travel along parallel paths. For example, for a LIDAR system to detect objects at short distances, the emitter and receiver may need to be physically tilted towards each other (as opposed to aligning them in parallel). However, this physical tilting may result in a loss of detection capabilities at long ranges from the LIDAR system. To address this, and to have the capability to handle both short and long-range detections, some systems may use a combination of a wide field of view and the aforementioned tilted assembly. This wide field of view, however, may result in another set of problems, including increasing the amount of background light detected by the receiver without increasing the amount of light emitted by the emitter, which may significantly increase the signal to noise ratio of the receiver. Additionally, also as mentioned above, bistatic LIDAR systems (or even LIDAR systems in general, including, for example, monostatic LIDAR systems) may have difficulty determining the source of certain return light based on range aliasing and/or cross talk problems.

To eliminate or mitigate the above parallax concerns with regards to bistatic LIDAR configurations, a LIDAR system may be used that may include multiple photodetectors to detect return light that is based on emitted light from an emitter device (for example, laser diode) of the LIDAR system. The photodetectors may be physically orientated (for example, pointed in at different angles) so that their individual fields of view include varying distances from the LIDAR system (for example, as depicted in FIG. 1). In such a configuration, a first photodetector may be physically oriented so that its detection field of view encompasses a physical space within a short range from the LIDAR system (for example, a range including a distance 0.1 m away from the LIDAR system to 0.195 m away from the LIDAR system encompassing a field of view of 2.85 degrees). A second photodetector may be physically oriented so that its detection field of view covers a physical space just beyond the physical space that the first photodetector covers (for example, a range including a distance 0.19 m away from the LIDAR system to 4.1 m away from the LIDAR system, also with a field of view of 2.85 degrees). Similarly, third photodetector may be physically oriented so that its detection field of view covers a physical space just beyond the physical space that the second photodetector covers (for example, a range including a distance 4 m away from the LIDAR system to an infinite distance away from the LIDAR system with a field of view of 2.85 degrees (these example distances and fields of view are provided as arbitrary examples, and any other ranges and/or fields of view may similarly be applicable). The total number of photodetectors included within the LIDAR system may be based on a number of factors. As a first example, the number may be based on a maximum detection range that is desired to be covered by the photodetectors. If the maximum detection range is a smaller distance from the LIDAR system, then a smaller number of photodetectors may be used, and if the maximum detection range is a larger distance from the LIDAR system, then a larger number of photodetectors may be used (it should be noted that while the term "maximum detection range" is used, this distance could theoretically extend out to infinity). As a second example, the number of photodetectors used may also be based on the size of the fields of view of individual photodetectors being used. A larger number of photodetectors may need to be employed if some or all of the individual photodetectors have a more narrow field of view. Likewise, a smaller number of photodetectors may be employed if some or all of the individual photodetectors have a broader field of view. These are just two non-limiting examples of factors that may influence the number of photodetectors used in the LIDAR system, and the number may also depend on any number of additional factors. As a third example, the number of photodetectors used may depend on the amount of overlap in the field of view between the photodetectors. In some instances, the transition between one photodetector's field of view to another photodetector's field of view may involve no overlap in the respective fields of view (that is, the end of one photodetector's field of view may exactly correspond with the beginning of another photodetector's field of view). In other instances, there may be some overlap between fields of view for different photodetectors. The overlap may serve as a safeguard to ensure that sufficient photons corresponding to return light may be detected by the photodetectors. The size of the overlap between the fields of view of the photodetectors may vary, and may depend on factors such as a relative size of the return light versus an the active area of the photodetectors. Furthermore, in some cases the direction in which individual photodetectors are pointing may be dynamically adjustable as well. In some embodiments, the photodetectors may be configured in an array such that they are physically spaced apart from one another at equal distances. However, in some embodiments, the photodetector arrays may also be physically spaced apart in unequal intervals. For example, a separation that is logarithmically based may be more beneficial to produce equal resolution to minimal range. This may be because using a linearly-spaced detector array with the same FoV may result in ranges that are asymmetrical, with a first detector in the array responsible for a smaller amount of physical space and the last photodetector in the array being responsible for a much larger amount of physical space (for example, 4 m to infinity). By moving to a different spacing model (for example, logarithmic spacing as described above), individual detector ranges may be optimized to be more equalized. This may ensure, for example, that multiple returns from any one area in the environment do not overload the receiver responsible for that area. Alternatively, more closely-spaced detectors may be used in the far-field to further reduce the FoV as the distance covered increases and the receiver cone becomes very large, thus making yourself less susceptible to noise in the far-field.

In some embodiments, the photodetectors may be selectively "turned on" and/or "turned off" (which may similarly be referred to as "activating" or deactivating" a photodetector). "Turning on" a photodetector may refer to providing a bias voltage to the photodetector that satisfies a threshold voltage level. The bias voltage satisfying the threshold voltage level (for example, being at or above the threshold voltage level) may provide sufficient voltage to the photodetector to allow it to produce a level of output current based on light received by the photodetector. The output threshold voltage level being used and the corresponding output current being produced may depend on the type of photodetector being used and the desired mode of the operation of the photodetector. For example, if the photodetector is an APD, the threshold voltage level may be set high enough so that the photodetector is capable of avalanching upon receipt of light as described above. Similarly, if it is desired for the APD to operate in Geiger Mode, the threshold voltage level may be set even higher than if the APD were desired to operate outside of the Geiger Mode region of operation. That is, the gain of the photodetector when this higher threshold voltage level is applied may be much larger than if the photodetector were operating as a normal Avalanche Photodiode. Additionally, if the photodetector is not an APD, and operates in a linear mode of operation in which the output current produced based on a similar amount of detected light may be much lower than if the photodetector were an APD, then the threshold bias voltage may be lower. Furthermore, even if the photodetector is an APD, the threshold voltage level may be set below a threshold voltage level used to allow the APD to avalanche upon receipt of light. That is, the bias voltage applied to the APD may be set low enough to allow the APD to still produce an output current, but only in a linear mode of operation.

Likewise, in some embodiments, "turning off" a photodetector may refer to reducing the bias voltage provided to the photodetector to below the threshold voltage level. In some instances, "turning off" the photodetector may not necessarily mean that the photodetector is not able to detect return light. That is, the photodetector may still be able to detect return light while the bias voltage is below the threshold voltage level, but the output signal produced by the photodetector may be below a noise floor established for a signal processing portion of the LIDAR system. As one non-limiting example, a photodetector may be an Avalanche Photodiode. If a sufficient enough bias voltage is provided to allow the APD to avalanche upon receipt of light, then a large current output may be produced by the APD. However, if a lower bias voltage is applied, then the APD may still produce an output, but the output may be based on a linear mode of operation and the resulting output current may be much lower than if the APD were to avalanche upon receipt of a same number of photons. The signal processing portion of the LIDAR system may have a noise floor configured to correspond to an output of the APD in linear mode, so that any outputs from the APD when operating with this reduced bias voltage may effectively be disregarded by the LIDAR system. Thus, selectively turning on and/or turning off the photodetectors may entail only having some of the photodetectors capable of detecting return light at a given time.

In some embodiments, the timing at which the photodetectors may be turned on and/or turned off may depend on predetermined time intervals. As a first example, these predetermined time intervals may be based on an amount of time that has elapsed since a given light pulse was emitted from the emitter of the LIDAR system. Continuing this first example, a first light pulse being emitted from the emitter may trigger a timing sequence. The timing sequence may involve individual photodetectors being turned on when return light corresponding to the emitted light pulse being reflect from an object may be expected to be within a field of view of a particular photodetector. Still continuing this first example, a first photodetector may be pointed in a direction such that its field of view may include a range of physical space within a closest distance from the LIDAR system (Rx 1 as depicted in FIG. 1 may provide a visual example of this first photodetector's field of view). This first photodetector may be the first photodetector to be turned on for a first time interval during which return light originating from the first light pulse may be expected to have been reflected from objects within the first field of view. As an example, the field of view of this first photodetector may include a range from 0.19 m away from the LIDAR system to 4.1 m away from the LIDAR system (again, it should be noted that any specific examples of ranges and/or fields of view of any photodetectors described herein may be arbitrary, and any other ranges and/or fields of view may similarly be applicable) from the LIDAR system. That is, if the emitted light were to be emitted from the LIDAR system and then reflect from an object in the environment within this range from the LIDAR system back towards the first photodetector, then the first photodetector pointing in that direction may be turned on and able to detect the return light. Once the first time interval has passed and a second time interval begins, a second photodetector may be turned on. Similar to the first time interval, the second time interval may correspond to a period of time during which any return light detected by the second photodetector is expected to have originated from an object in the field of view of the second photodetector. This process may continue with some or all of the remaining photodetectors in the array being turned on after successive time intervals of previous photodetectors in the array have passed. This process may be visualized, for example, in FIG. 2, as described below. Additionally, in some cases, once a time interval associated with a field of view of a particular photodetector has passed, that photodetector may be turned off as well. That is, only the photodetector associated with the current time interval may be turned on at any given time. This may provide a number of benefits, such as serving to reduce extraneous data received by the other photodetectors during this time and/or reducing the power consumption of the LIDAR system, to name a few examples. In some embodiments, however, some or all of the photodetectors may remain on through multiple time intervals, or may remain on at all times. This may be beneficial because it may allow as much data from the environment to be captured as possible. Additionally, the time intervals may not necessarily need to be the same length of time. For example, a time interval associated with a given photodetector may depend on the size of the field of view of the photodetector. That is, a photodetector with a more narrow field of view may be associated with a shorter time interval than a photodetector with a more broad field of view. This situation may arise when photodetectors with varying sizes of field of view are employed. Additionally, in some cases, any other type of time interval may be used to determined when to turn on and/or turn off any of the photodetectors included within the LIDAR system.

In some embodiments, the bias voltage provided to an individual photodetector during a given time interval may not necessarily be fixed. That is, the bias voltage that is provided to the photodetector may vary over time based on a certain function (for example, "function" may refer to a magnitude of bias voltage applied with respect to time. That is, if a plot of the bias voltage applied over time were to be created, the function would be visualized by the plot). The function may not necessarily only involve the threshold voltage level only either being at threshold voltage level or at a value below the threshold voltage value (that is, if the bias voltage applied were plotted as a function, it may not necessarily look like a step function that rises to the threshold voltage level at the beginning of the time interval and drops below the threshold voltage level at the end of the time interval). The function may instead be associated with a certain degree of change in the bias voltage throughout the time interval. For example, the function may represent a Gaussian function. Using this type of function to dictate the bias voltage being provided, for example, the bias voltage may increase over a first period of time, reach a peak bias voltage, and then may decrease back down to below the threshold voltage level over a second period of time. In some cases, the peak of the example Gaussian function may be maintained throughout the entire predetermined time interval associated with the particular photodetector. In some cases, the upward slope of the Gaussian function may begin at the beginning of the time interval and the peak of the Gaussian function may be reached at a certain amount of time after the beginning of the time interval. This may be desirable if it is desirable for the photodetector to be at its most sensitive to return light at a particular portion of its field of view. In some cases, the upward slope of the example Gaussian function may begin during the time interval of a previous photodetector (and likewise the downward slope may extend into the time interval for a successive photodetector's time interval). In some cases, the function may be any other function other than a Gaussian function (for example, the function may actually even be a step function in some instances). That is, the bias voltage applied to a given photodetector may vary over time in any other number of ways. Additionally, different photodetectors may be associated with different types of functions. Different photodetectors may also be associated with the same type of function, but certain parameters of the function may vary. For example, the peak of a Gaussian function used for one photodetector may be greater than the peak of a Gaussian function used for a second photodetector. The functions used may also vary for different emitted light pulses from the LIDAR system. That is, when the LIDAR system emits a first light pulse, a first type of function may be used, but when the LIDAR emits a subsequent light pulse, a second type of function may be used. The above examples of how different functions may be used to control the bias voltage applied to a photodetector may merely be exemplary, and any other type(s) of functions may be applied to any combination of photodetectors based on any number of timing considerations.

In some embodiments, the manner in which photodetectors are turned on and/or off may also be dynamic instead of being based on fixed time intervals that are used for successive light pulse emissions from the emitter. That is, the time intervals used to determine the bias voltage to be provided to different photodetectors may not consistently iterate in the same manner forever, but may rather change over time. In some cases, the time intervals used for some or all of the photodetectors may change after each successive emitted light pulse by the emitter. In some cases, the time intervals may change after a given number of emitted light pulses are emitted by the emitter. In some cases, the time intervals may also change within a period of time during which a single emitted light pulse may currently be traversing the environment. That is, a light pulse may be emitted, a first photodetector may be turned on for a first time interval, and then a second time interval for a second photodetector may be dynamically changed to a different time interval. In some cases, these time interval changes may be based on data that is received from the environment. That is, an closed loop feedback system may be implemented to vary the time intervals (it should be noted that this closed loop feedback system may similarly be used to dynamically adjust the types of functions used to dictate the bias voltage provided to different photodetectors.

In some embodiments, the physical orientation of the photodetectors may also be either fixed and/or dynamically configurable. That is, individual photodetectors may include an actuation mechanism that may allow the direction in which a photodetector is pointed to be dynamically adjusted (and consequentially, the fields of view of the photodetectors may be dynamically adjustable). For example, the actuation mechanism may include microelectromechanical systems (MEMS), or any other type of actuation mechanism that may allow a photodetector to adjust the direction in which it points. This dynamic adjustment of the physical orientation of one or more of the photodetectors may be performed for any number of other reasons. As a first example, within the time period during which one particular emitted light pulse is traversing the environment, a first photodetector may be turned on and data may be captured by that first photodetector. A direction in which a second photodetector is pointing may then be adjusted based on the data captured by the first photodetector. As a second example, multiple photodetectors may be adjusted to point in the same direction. This may be desirable because this may allow for more data to be captured from a particular portion of the environment than if a single photodetector were used to capture data from that portion of the environment. This may be beneficial because one photodetector may serve as serve as a failsafe for another photodetector (that is, one photodetector may serve to validate the data received by the other photodetector or may serve to capture data from the portion of the environment if the other photodetector is unable to do so for a given period of time). This may also be useful if the portion of the environment is determined to be an area of interest and thus it is desirable to obtain as much data from that portion of the environment as possible. However, these are merely examples of reasons for adjusting the physical orientation of one or more of the photodetectors, and such adjustments may be made for any other number of reasons as well.

In some embodiments, the circuitry (examples of which may be depicted in FIGS. 4A-4B) used to capture the data being produced by individual photodetectors within the photodetector array may involve providing individual analog to digital converters (ADCs) for each photodetector. An analog to digital converter may take an analog signal as an input and produce a corresponding digital output. The current output by a photodetector may be an analog signal, so the analog to digital converter may take this signal as an input and convert it into a digital form that may be used by a signal processing portion of the LIDAR system. In some embodiments, however, a single ADC may be used for multiple of the photodetectors or all of the photodetectors. In such embodiments, the outputs of the individual photodetectors may be summed and provided as a single output to the ADC. The summing may be performed using a summer circuit, which may comprise more than one circuits that are capacitive coupled together, or may also be in the form of an op-amp summer. Additionally, prior to summing the outputs of the individual photodetectors, one or more attenuators may be used to attenuate one the outputs of one or more of the photodetectors may be performed as well. For example, if all of the detectors are turned on at all times, the attenuators may be used to attenuate outputs of certain detectors at certain times. For example, the attenuation may be performed to attenuate the outputs of all of the detectors except one detector. For example, the one detector may correspond to a field of view in which it is expected return light from an emitted light pulse would currently be located. The attenuators may thus serve to reduce the amount of detector output noise that is provided the ADC and signal processing components 410. The attenuators may also be used in other ways as well. For example, all of the outputs of the detectors may be left unattenuated unless it is determined that it is desired to block the output of one or more detectors. In some cases, either of the aforementioned circuitry embodiments may be employed when some or all of the photodetectors remain turned on at all times, instead of being selectively turned on and off during a single light pulse emissions. In some embodiments, however, the circuitry may also be employed when the photodetectors are selectively turned on and/or off as well. For example, in scenarios where a photodetector is selectively turned on as return light based on an emitted light pulse is expected to enter a field of view of the photodetector (that is, only one photodetector is turned on at a time), a single ADC may be employed. In such cases, there may not be any need for summing and/or attenuation as may be the case when multiple or all photo-detectors are turned on at the same time. If the photodetector that is used has a long recovery period, then this configuration may help to prevent background noise from reducing a dynamic range.

In some embodiments, the use of multiple photodetectors as described herein may also have the added benefit of mitigating range aliasing concerns that may arise in LIDAR systems. Range aliasing may be a phenomenon that may occur when a two or more different light pulses emitted by an emitter of the LIDAR system are simultaneously traversing the environment. For example, the emitter of the LIDAR system may emit a light pulse at a first time, and a time at which the light pulse would be expected to return to the LIDAR system from a maximum detection range may elapse. The LIDAR system may then emit a second light pulse. A short time after this second light pulse is emitted, return light based on the first light pulse reflecting from an object outside the maximum detection range may be detected. When this is the case, the LIDAR system may incorrectly identify the return light pulse as being a short range return of the second light pulse instead of a long range return from the first light pulse. This may be problematic because light associated with multiple emitted light pulses from the LIDAR system may exist in the environment during any given time interval. This may result in the shot rate (the rate at which subsequent light pulses may be emitted by the emitter) of the LIDAR system being lowered to reduce the likelihood of numerous light pulses traversing the environment at the same time and resulting in this range aliasing problem.

In some embodiments, using multiple photodetectors in the manner described herein may mitigate or eliminate range aliasing concerns because more data about the environment may be ascertained than if only one photodetector was used. This concept may be further exemplified in FIG. 3. For example, a first light pulse may be emitted at a first time. The first light pulse may traverse the environment, and successive individual photodetectors may be turned on and/or off at varying time intervals as the first light pulse traverses further away from the emitter. However, instead of turning off the last photodetector (for example, the photodetector with the detection range furthest from the LIDAR system) when the first light pulse travels beyond the field of view of the last photodetector without reflecting from an object and being detected by the last photodetector, the last photodetector may be kept turned on as the first light pulse continues to travel beyond the field of view of the last photodetector. Continuing this example, a second light pulse may then be emitted by the emitter. A short time after the second light pulse is emitted (for example, when it is within the field of pulse is emitted (for example, when it is within the field of view of a first photodetector with a field of view including a closest distance range to the emitter) the last photodetector may detect return light. In this case, it is known that the second light pulse would not have traveled far enough to be detected by the last photodetector as return light, so the detection by the last photodetector is more likely associated with the first light pulse. In this manner, it may be more easily ascertained which light pulse a detected light return may be associated with.

As another example of how range aliasing concerns may be mitigated and/or eliminated by the use of multiple photodetectors, if the photodetectors are controlled to be turned on and/or off based on predetermined time intervals as described above, then return light that reflects from an object beyond the maximum detection range of the LIDAR system may never be detected (which may eliminate the possibility for range aliasing). The reason for this may be exemplified as follows. In this example, a first light pulse is emitted. The photodetectors then proceed through their sequence of turning on and/or off as described above until the final photodetector (the photodetector with the longest distance field of view from the LIDAR system) is turned off (when any expected return light would originate from beyond the maximum detection range). Then a second light pulse is emitted from the LIDAR system. If there were only one photodetector that was always turned on, then return light from the first light pulse may then return and be detected by the photodetector. However, if there are multiple photodetectors and each is only turned on for a given time interval, then it is more likely that return light that is detected by a given photodetector would have originated from the second light pulse. That is, unless return light based on the first light pulse were to reach a field of view during the time interval at which that particular photodetector is turned on. Even if this scenario does take place (the return light from the first light pulse reaches a photodetector's field of view while that photodetector is turned on), the use of the multiple photodetectors may still allow for a determination to be made that the detected return light could potentially originate from the first light pulse. That is, if the return light from the first pulse returns and is detected by one of the turned on photodetectors, but the second light pulse has still not reflected from an object back towards a photodetector, then return light from the light pulse may be detected by a subsequent photodetector that is turned on. This means that return light from both pulses may be received, and the LIDAR system may thus be able to determine that at least one of the return light detections was based on range aliasing. If this is the case, the LIDAR system may simply disregard both of these two detected returns.

In some embodiments, mitigating range aliasing as described above may have the added benefit of allowing for a larger number of light pulses being emitted within a time frame than if range aliasing were not mitigating using these systems and methods. This may be because it may not be as concerning to have more light pulses traversing the environment at the same time if it is more likely that the LIDAR system may be able to determine which return light is associated with which emitted light pulse. The ability to emit more light pulses in a given period of time may result in a larger amount of data being able to be collected about the environment at a faster rate.

In some embodiments, the multiple photodetector bistatic LIDAR systems described herein may also have the further benefit of mitigating or eliminating cross talk between different LIDAR systems. Cross talk may refer to a scenario that arises when an emitter from a first LIDAR system is pointed towards a second LIDAR system. If the first LIDAR system emits a light pulse, that light pulse may then travel towards the second LIDAR system and be detected by a photodetector of the second LIDAR system. Similar to range aliasing concerns, the second LIDAR system may have difficulty in discerning between its own emitted light pulses and a light pulse originating from another LIDAR system if only one photodetector is used. This cross talk scenario may be mitigated or eliminated in a similar manner in which range aliasing may be mitigated or eliminated.

In some embodiments, the multiple photodetector bistatic LIDAR systems described herein may also have further benefits even beyond mitigating parallax, range aliasing, and/or cross talk concerns. For example, the use of the multiple photodetectors may mitigate a scenario where one particular photodetector may become saturated by a bright light. When this is the case, the photodetector may enter a recovery period during which it may not be able to detect any subsequent light. If only one photodetector is used in a LIDAR system, then the LIDAR system may become blind to return light during this recovery period. However, if multiple photodetectors are used, any of the other photodetectors may be used as backups for the photodetector currently in its recovery period.

Turning to the figures, FIG. 1 may depict a high-level schematic diagram of an example LIDAR system 101 that may implement the multiple detectors as described herein. A more detailed description of an example LIDAR system may be described with respect to FIG. 6 as well. With reference to the elements depicted in the figure, the LIDAR system 101 may include at least one or more emitter devices (for example, emitter device 102a, and/or any number of additional emitter devices) and one or more detector devices (for example, detector device 106a, detector device 106b, detector device 106c, and/or any number of additional detector devices). Hereinafter, reference may be made to elements such as "emitter device" or "detector device," however such references may similarly apply to multiple of such elements as well. In some embodiments, the LIDAR system 101 may be incorporated onto a vehicle 101 and may be used at least to provide range determinations for the vehicle 101. For example, the vehicle 101 may traverse an environment 108 and may use the LIDAR system 101 to determine the relative distance of various objects (for example, the pedestrian 107a, the stop sign 107b, and/or the second vehicle 107c) in the environment 108 relative to the vehicle 101.

Still referring to FIG. 1, the one or more detector devices may be configured such that individual detector devices are physically oriented to point in different directions. Consequentially, different detectors may have different corresponding fields of view in the environment 108. For example, detector device 106c may be associated with field of view 110, detector device 106b may be associated with field of view 111, and detector device 106a may be associated with field of view 112. As depicted in the figure, a field of view of an individual detector device may cover a particular range of distances from the emitter 102a. For example, the field of view 110 of detector device 106c is shown to cover a closest range of distances to the emitter 102a, field of view 111 of detector device 106b is shown to cover an intermediate range of distances to the emitter 102a, and field of view 112 of detector device 106a is shown to cover a furthest range of distances from the emitter 102a. Thus, taken together, the detector devices may cover a total field of view comprising the field of view 110, the field of view 111, and the field of view 112. Although the figure depicts three detector devices with three associated fields of view, the total view of view may similarly be split between any number of detector devices as well. Additionally, as depicted in the figure, one field of view for one photodetector may begin at an exact location where a prior field of view for another photodetector ends, leaving no field of view blind spot between photodetectors. However, in some cases (not depicted in the figure, there may be overlap between the various fields of view of the different photodetectors as well. The different fields of view may allow the different detector devices to detect return light 120 from the environment 108 that is based on the emitted light 105 from the emitter 102a. Due to the varying range of distances the different fields of view cover, each detector device may be configured to detect objects at varying distances from the vehicle 101. For example, because the detector device 106c is associated with field of view 110 that covers distances closest to the vehicle 101, the detector device 106c may be configured to detect return light 120 that is reflected from objects a shorter distance away from the vehicle 101 (for example, the vehicle 107c). As is described herein, the detector devices may also be selectively turned on and/or turned off based on time estimates as to when return light 120 would be within the field of view of the individual detector devices.

Example Use Cases

Figure 2A:
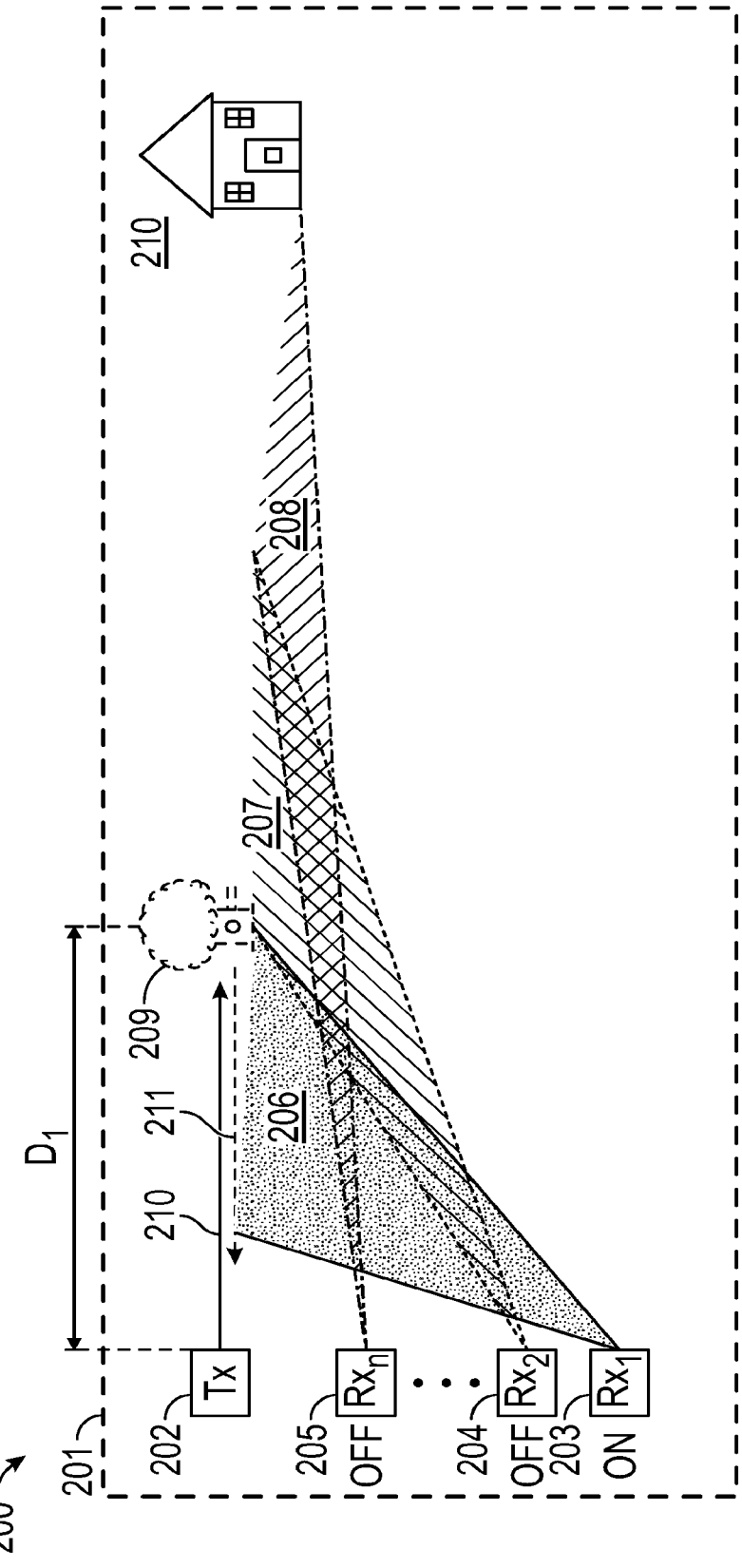
FIGS. 2A-2B depict an example use case, in accordance with one or more example embodiments of the disclosure.
Figure 2B:
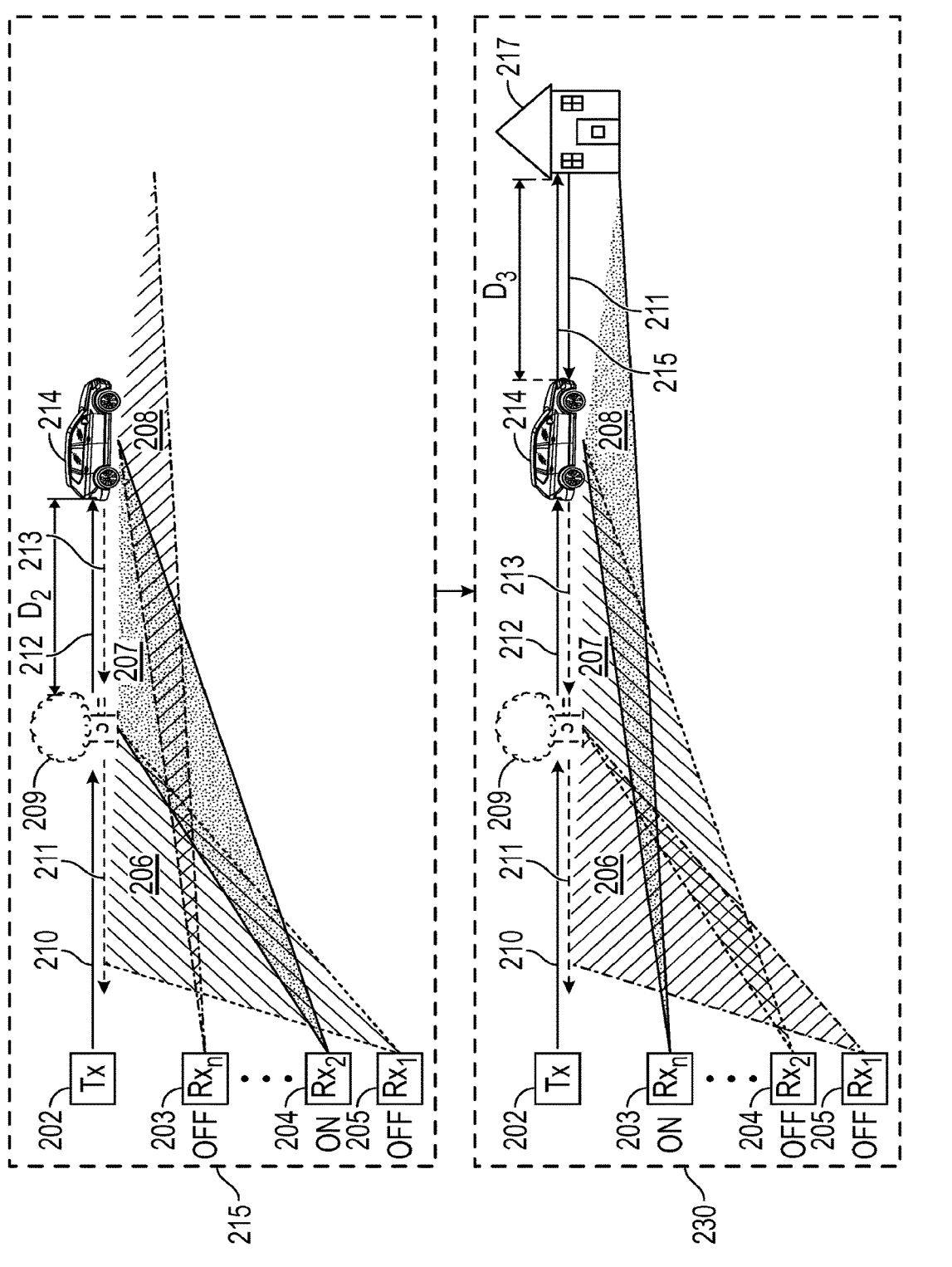

FIGS. 2A-2B depicts an example use case 200, in accordance with one or more example embodiments of the disclosure. The use case 200 may exemplify a manner in which the one or more detectors may be selectively turned on and/or turned off (as described above) during various time intervals subsequent to a light pulse being emitted from an emitter. The use case 200 may depict an emitter 202, which may be the same as emitter 102a described with respect to FIG. 1, as well as any other emitter described herein. The use case 200 may also depict one or more detectors, including, for example, a first detector 203, a second detector 204, and a third detector 205, which may be the same as detector device 106a, detector device 106b, and/or detector device 106c, as well as any other detectors described herein. Each of the detectors may have an associated field of view. For example, the first detector 203 may be associated with field of view 206, the second detector 204 may be associated with field of view 207, and the third detector 205 may be associated with field of view 208. As with the fields of view in FIG. 1, the individual fields of view in the use case 200 of FIG. 2 (for example, field of view 206, field of view 207, and/or field of view 208) may include varying distance ranges from the emitter 202 (or, more broadly speaking, from the LIDAR system). The fields of view may allow for the detectors to detect return light (for example, return light 211, return light 213, and/or return light 215) that is reflected from objects in the environment (for example, a tree 209, a vehicle 214, and/or a house 219). As depicted in use case 200, field of view 206 associated with the first detector 203 may cover a distance range that may be closest to the emitter 202 (or the LIDAR system), field of view 207 associated with the second detector 204 may cover a distance range that is intermediate from the emitter 202 (or the LIDAR system), and field of view 208 associated with the third detector 205 may cover a distance range that is furthest from the emitter 202 (or the LIDAR system). Taken together, the field of view 206, field of view 207, and field of view 208 may cover a total field of view of the LIDAR system. That is, an individual detector with its corresponding field of view may cover a portion of the total field of view of the LIDAR system, and all of the fields of view taken together may cover the desired field of view of the LIDAR system. For example, the desired total field of view may correspond to a maximum detection range of the LIDAR system, which may be predefined, or selected based on any number of factors. Although use case 200 may only depict three detectors with three corresponding fields of view, any other number of detectors and associated fields of view may be used to cover a detection range of the LIDAR system. The detectors may be the same as the detectors depicted with respect to FIG. 1, as well as any other detectors described herein. In some cases, the emitter 202 and one or more detectors may be a part of an overall LIDAR system, such as a bistatic LIDAR system. That is, the use case 200 may depict a use case being implemented by the LIDAR system depicted in FIG. 1, for example.

Referring to FIG. 2A, the use case 200 may initiate with scene 201. Scene 201 may involve the emitter 202 of the LIDAR system emitting a light pulse 210 into the environment 210. Scene 201 may also depict that, subsequent to the light pulse 210 being emitted by the emitter 202, the detector with a field of view 206 that covers a distance range closest to the emitter 202 (the first detector 203) may be turned on. This first detector 203 may be turned on for a given first time interval, $\Delta T_1$. During this first time interval, the other detectors in the LIDAR system (for example, second detector 204 and third detector 205) may be turned off, which may be represented by their fields of view being depicted as dashed lines. The first time interval, $\Delta T_1$, may correspond to a time interval during which return light reflected from an object in the environment would be expected to be within the field of view 206 of the first detector 203. For illustrative purposes, scene 201 may depict a tree 209 at a distance D1 from the emitter 202 that is within the field of view 206, and that reflects return light 211. This return light 211 may then be detected by the first detector 203. It should be noted that the tree 209 (and associated return light 211) may be depicted in dashed lines as an example of what return light in the field of view 206 may look like. However, for the sake of continuing the example in subsequent scenes of this use case 200, the tree 209 may be considered to not actually exist in the environment so that the light pulse 210 may traverse the environment to further distances from the emitter 202.

Continuing with FIG. 2B, the use case 200 may proceed with scene 215. Scene 215 may involve the light pulse 210 continuing to traverse the environment beyond the location of the tree 209 as shown in scene 201. Scene 215 may take place during a second time interval, $\Delta T_2$. During the second time interval, the first detector 203 may be turned off and the second detector 204 may be turned on. That is, the second detector 204 may now be the only detector that is currently turned on. Similar to the first time interval, the second time interval, $\Delta T_2$, may correspond to a time interval during which return light reflected from an object in the environment would be expected to be within the field of view 207 of the second detector 204. As depicted in the figure, the second detector 204 may include a field of view 207 including a distance range that begins starting with the end of the distance range covered by the field of view 206 of the first detector 203. In some cases, although not depicted in the figure, there may also be some overlap between the field of view 207 and/or the field of view 206. For illustrative purposes, scene 215 may thus depict a vehicle 214 at a distance D2 from the tree 209 that is within the field of view 207, and that reflects return light 213. This return light 213 may then be detected by the second detector 204. Again, it should be noted that the vehicle 214 (and associated return light 213) may be depicted in dashed lines as an example of what return light in the field of view 207 may look like. However, for the sake of continuing the example in subsequent scenes of this use case 200, the vehicle 214 may be considered to not actually exist in the environment so that the light pule 210 may traverse the environment to greater distances as depicted in scene 230 described below.

Continuing with FIG. 2B, the use case may proceed to scene 230. Scene 230 may involve the light pulse 210 continuing to traverse the environment beyond the location of the vehicle 214 as shown in scene 215. Scene 230 may take place during a third time interval, $\Delta T_3$. During the third time interval, the second detector 204 may be turned off and the third detector 205 may be turned on. That is, the third detector 205 may now be the only detector that is currently turned on. Similar to the first time interval and the second time interval, the third time interval, $\Delta T_3$, may correspond to a time interval during which return light reflected from an object in the environment would be expected to be within the field of view 208 of the third detector 205. As depicted in the figure, the third detector 205 may include a field of view 208 including a distance range that begins starting with the end of the distance range covered by the field of view 207 of the second detector 204. In some cases, although not depicted in the figure, there may also be some overlap between the field of view 207 and/or the field of view 208. For illustrative purposes, scene 230 may depict a home 217 that is a distance D3 from the vehicle 214 that is within the field of view 208, and that reflects return light 218. This return light 218 may then be detected by the third detector 205.

Continuing with FIG. 2, the use case 200 may thus depict a progression of an example of how various detectors may be selectively turned on and/or turned off over time as an emitted light pulse traverses further into the environment 210. However, this use case 200 should not be taken as limiting, and the detectors may be operated in any other manner as may be described herein. For example, in some cases, all of the detectors may be turned on at all times (instead of individual detectors being selectively turned on and/or turned off), more than one detector may be turned on at any given time, and/or any number of detectors may be turned on in any other combination for any other length of times. Additionally, in scenarios where detectors are selectively turned on and/or off, as shown in the use case 200, the time intervals during which the various detectors are turned on and/or off may vary. For example, the time interval during which one detector is turned on may be shorter and/or longer than the time interval during which another detector is turned on. In some cases, the timing may depend on one or more types of functions used to determine the bias voltage to apply to a given photodetector over time. For example, as described herein, the bias voltage applied to the different photodetectors may be represented as a time-shifted Gaussian function. That is, within a given time interval, the bias voltage applied to the detector 205 may ramp up to a peak bias voltage value, and then ramp back down as the end of the time interval is approached. Similarly, as the end of the first time interval approaches and the beginning of the second time interval associated with the detector 204 approaches, the bias voltage may begin to ramp up for the detector 204 using a similar Gaussian function, and so on. Finally, although the fields of view (for example, field of view 206, field of view 207, and/or field of view 208) are shown as being fixed in the use case 200, any of these fields of view may also be adjustable. That is, a field of view may be broadened or narrowed, or a direction of a field of view may be altered. The field of view may also be altered in any other manner, such as introducing optical systems that may alter the direction of the field of view. As described herein, the field of view may be altered for any number of reasons, such as to focus multiple detectors towards a similar location within the environment.

Figure 3:
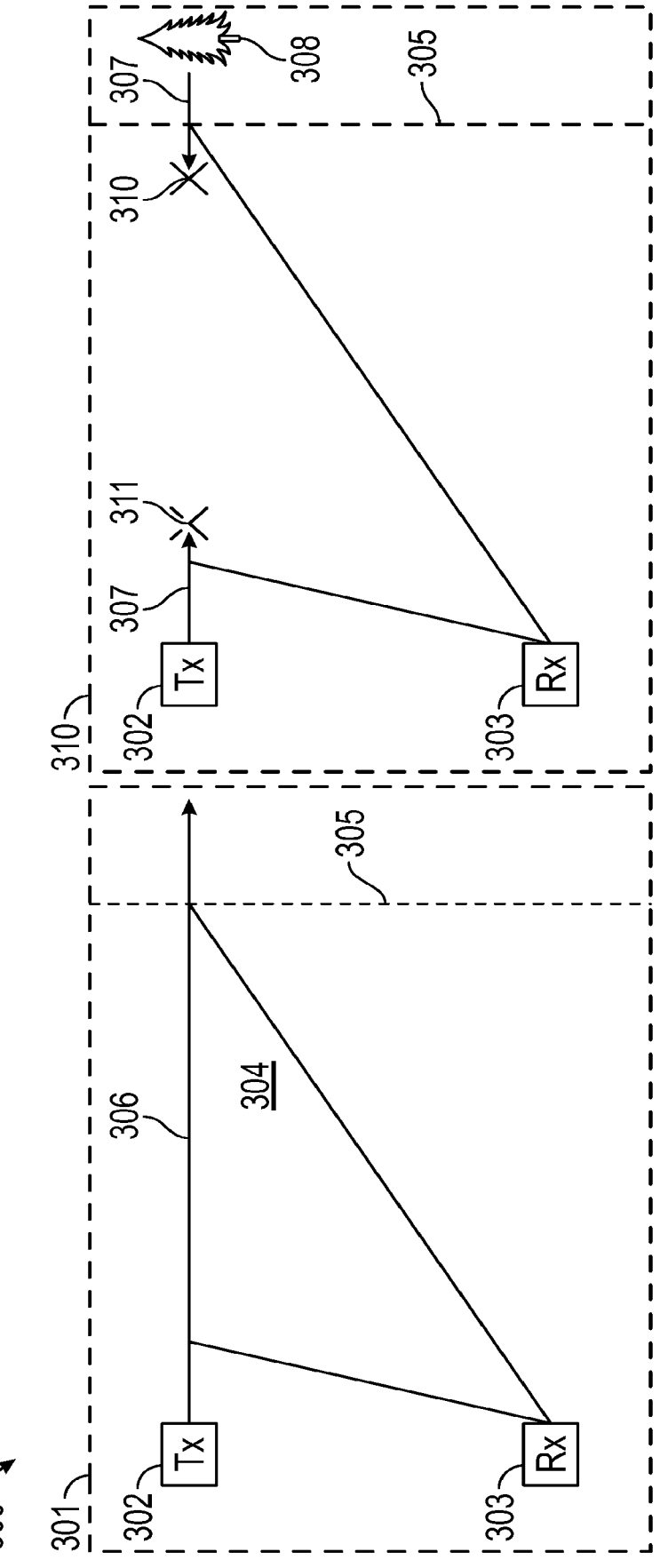
FIG. 3 depicts an example use case, in accordance with one or more example embodiments of the disclosure.
Figure 3:
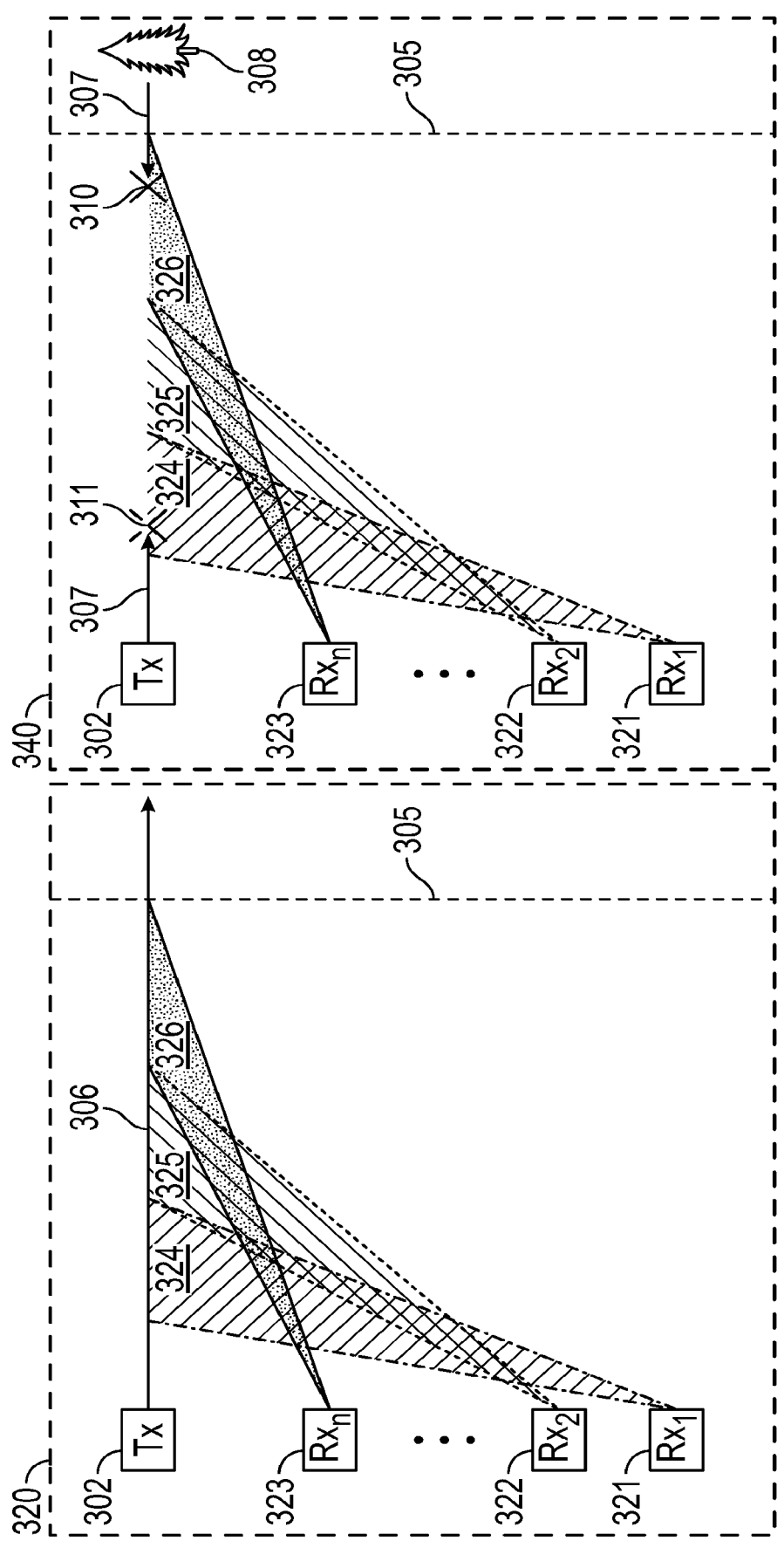

FIG. 3 depicts an example use case 300, in accordance with one or more example embodiments of the disclosure. The use case 300 may depict one example of how range aliasing concerns may be mitigated and/or eliminated by the multi-detector systems and methods described herein. Use case 300 may depict two parallel timelines. Scenes 301 and 310 may comprise one timeline and scenes 320 and 340 may comprise a second, parallel timeline. Scenes 301 and 310 may be included to depict how range aliasing issues may arise in single detector LIDAR systems, and scenes 320 and 340 may depict how these issues may be ameliorated by using a multi-detector system as described herein. As such, scenes 301 and 310 may depict a LIDAR system that may only include one emitter 302 and one detector 303. The detector 303 may be capable of detecting return light with a field of view 304 that may cover up to a maximum detection distance 305.

Beginning with scenes 301 and 310, scene 301 may depict the emitter 302 emitting a first light pulse 306 into the environment. The first light pulse 306 is shown as traversing the environment and eventually moving past the maximum detection distance 305 of the detector 303. That is, the first light pulse 306 in scene 301 may not yet have reflected from an object in the environment as return light and been detected within the field of view 304 of the detector 303. With this being the case, a potential range aliasing problem may arise as depicted in scene 310. In scene 310, the emitter 302 is shown as emitting a second light pulse 307 into the environment. However, at some point while the second light pulse 307 is traversing the environment, the first light pulse may finally reflect from an object (for example, tree 308) and return towards the field of view 304 of the detector 303 as return light 309. The return light 309 may then be detected by the detector 303 at point 310, which may correspond to a point when the return light 309 first enters the field of view of the detector 303 (which, for exemplification purposes, may take place at a first time). However, at the first time when the return light 309 from the first light pulse 306 is detected by the detector 303 at point 310, the second light pulse may also be currently within the environment at point 311. That is, the second light pulse 307 may have only traveled a short distance from the emitter 302 by the time the return light 309 from the first light pulse 306 is detector by the detector 303. When this happens, the back-end signal processing components of the LIDAR system (not shown in the figure) may have difficulty in determining whether the return light that was detected by the detector 303 is a short range detection based on the second light pulse 307, or a long range detection based on the first light pulse 306. This may be because distance determinations based on the emitted light pulses from the emitter 302 may be made based on time of flight (ToF) determinations, for example. That is, the LIDAR system may ascertain when a light pulse is emitted, and may then compare the emission time to a time at which return light is detected by the detector determine The resulting difference in time may then be used to determine the distance at which the emitted light was reflected back to the LIDAR system. Given this, the LIDAR system may not be able to discern between two light pulses at different distances within the field of view 304 of the single detector 303 since both light pulses could theoretically be the source of the return light being detected by the detector 303.

Continuing with FIG. 3, scene 320 and scene 340 may depict an example manner in which the multi-detector systems described herein may mitigate or eliminate the range aliasing concerns exemplified in scene 301 and scene 310. Scene 320 and scene 340 may thus depict a multi-detector system that may include an emitter 302 and one or more detectors (for example, first detector 321, second detector 322, and/or third detector 323, which may be the same as the first detector 203, the second detector 204, and/or the third detector 205, as well as any other detectors described herein). A detector may be associated with a field of view covering a particular distance range from the emitter 302. For example, the first detector 321 may be shown as being associated with field of view 324 that may include a distance range closest to the emitter 302. The second detector 322 may be shown as being associated with field of view 325 that may include a distance range beyond the distance range covered by the field of view 324 of the first detector 321. Finally, the third detector 323 may be shown as being associated with field of view 326 that may include a distance range beyond the distance range covered by the field of view 325 of the second detector 322. Additionally, for exemplification purposes, the combination of the field of view 324, field of view 325, and field of view 326, may cover the same maximum detection range 305 from the emitter 302.

Continuing with FIG. 3, scene 320 may begin, similar to scene 301, with the emitter 302 emitting a first light pulse 306 into the environment. Again, the first light pulse 306 is shown as traversing the environment and eventually moving past the maximum detection distance 305 of the first detector 321, the second detector 322, and the third detector 323. That is, the first light pulse 306 may not have reflected from an object in the environment and been detected by the first detector 321, the second detector 322, or the third detector 323. Also similar to scene 310, in scene 340 the emitter 302 may then emit a second light pulse 307. However, the difference between scene 310 with the single detector 303 and the scene 340 with the multiple detectors may be that the multiple detectors may be used to provide more data about detected return light than the single detector 303 may be able to. For example, as described herein, individual detectors may be able to be selectively turned on and/or off as the light pulse traverses the environment. Thus, the first detector 321, the second detector 322, and the third detector 323 may be selectively turned on and then off as the first light pulse 306 traverses further away from the emitter 302. To mitigate range aliasing, instead of turning off the third detector 323 when it is determined that the time in which a return light pulse originating from the first light pulse would be beyond the field of view 236 of the third detector 323, the third detector 323 may be kept on even as the first light pulse 306 travels beyond the maximum detection range 305 of the detectors.

Still continuing with FIG. 3, scene 340 shows the same second light pulse 307 being emitted from the emitter 302 before the first light pulse 306 reflects from an object and is detected by one of the detectors. However, the difference here is that the LIDAR system now has two separate detectors monitoring two different distances from the emitter 302. That is, now both the first detector 321 with a known field of view 324 closer to the emitter 302 and the third detector 323 with a known field of view 326 that is further away from the emitter 302 are turned on. Thus, as shown in scene 340, if the first light pulse 306 then reflects from an object in the environment (for example, the tree 308) and returns back into the field of view 326 of the third detector 323 as return light 309, then third detector 323 may produce an output indicating that it detected return light at the same first time described in scenes 301 and 310. In the example depicted in scene 340, this first time may correspond to a time at which return light originating from the second light pulse 307 may be within the field of view 324 of the first detector 321 (thus, the first detector 321 is shown as being on). With this being the case, the system is then able to discern that the return light detected by the third detector 323 is associated with the first light pulse 306 instead of the second light pulse 307. Thus, with this multi-detector configuration, a LIDAR system may be able to track multiple light pulses traversing the environment simultaneously with reduced concern that range aliasing will cause difficultly in discerning between returns from the multiple emitted light pulses. Something about can double your shot rate (or even more).

Continuing with FIG. 3, it should be noted that the use case 300 (specifically scenes 320 and 340 of use case 300) may depict only one example of how a multi-detector system may be used to mitigate or eliminate range aliasing concerns. As another example of how range aliasing concerns may be mitigated and/or eliminated by the use of multiple photodetectors, if the photodetectors are controlled to be turned on and/or off based on predetermined time intervals as described above, then return light that reflects from an object beyond the maximum detection range of the LIDAR system may never be detected (which may eliminate the possibility for range aliasing). The reason for this may be exemplified as follows. In this example, a first light pulse is emitted. The photodetectors then proceed through their sequence of turning on and/or off as described above until the final photodetector (the photodetector with the longest distance field of view from the LIDAR system) is turned off (when any expected return light would originate from beyond the maximum detection range). Then a second light pulse is emitted from the LIDAR system. If there were only one photodetector that was always turned on, then return light from the first light pulse may then return and be detected by the photodetector. However, if there are multiple photodetectors and each is only turned on for a given time interval, then it is more likely that return light that is detected by a given photodetector would have originated from the second light pulse. That is, unless return light based on the first light pulse were to reach a field of view during the time interval at which that particular photodetector is turned on. Even if this scenario does take place (the return light from the first light pulse reaches a photodetector's field of view while that photodetector is turned on), the use of the multiple photodetectors may still allow for a determination to be made that the detected return light could potentially originate from the first light pulse. That is, if the return light from the first pulse returns and is detected by one of the turned on photodetectors, but the second light pulse has still not reflected from an object back towards a photodetector, then return light from the light pulse may be detected by a subsequent photodetector that is turned on. This means that return light from both pulses may be received, and the LIDAR system may thus be able to determine that at least one of the return light detections was based on range aliasing. If this is the case, the LIDAR system may simply disregard both of these two detected returns.

Example System Architecture

Figure 4A:
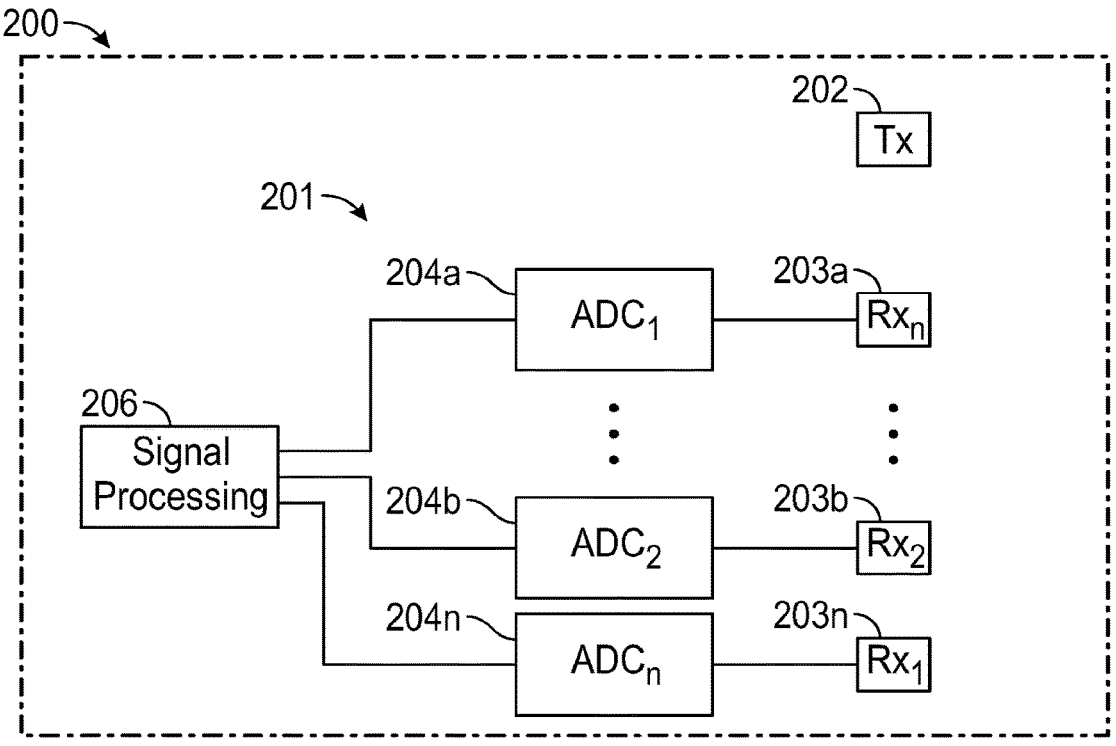
FIGS. 4A-4B depict example circuit configurations, in accordance with one or more example embodiments of the disclosure.
Figure 4B:
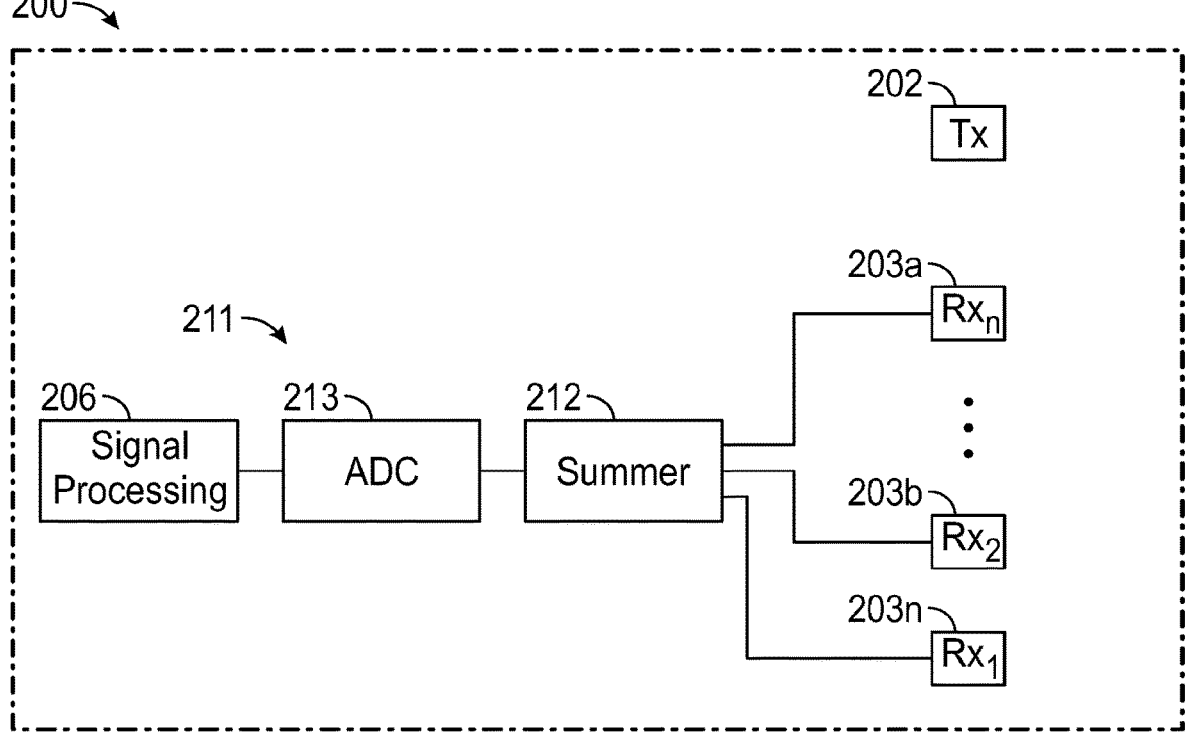

FIGS. 4A-4B depict example circuit configurations, in accordance with one or more example embodiments of the disclosure. The circuit configurations depicted in FIGS. 4A-4B may represent a back-end circuit connected to the outputs of the detectors. This back-end circuit may be used, for example, to pre-process the outputs of the detectors for any signal processing components of the LIDAR system (for example, systems that may make computing determinations based on the data received from the detectors). In some embodiments, FIG. 4A depicts a first circuit configuration 400. In the first circuit configuration, individual detectors (for example, detector 403, detector 404, and/or detector 405) may be associated with their own individual analog to digital converters (ADCs) (for example, detector 403 may be associated with analog to digital converter 406, detector 404 may be associated with analog to digital converter 407, and detector 405 may be associated with analog to digital converter 408). An ADC may be used to convert an analog signal to a digital signal. That is, the ADC may be capable of receiving the analog output of a detector as an input and converting that analog signal into a digital signal. This digital signal may then be used by one or more signal processing components 410 of the LIDAR system. As a more specific example, a detector may be configured to receive one or more photons as an input and provide current as an output. This current output may be in analog form, and the ADC may convert the analog current into a digital current value for use by the one or more signal processing components 410.

In some embodiments, FIG. 4B depicts a second circuit configuration 420. While the first circuit configuration 400 shown in FIG. 4A included multiple ADCs (for example, one ADC for each detector), the second circuit configuration 420 may only include one ADC for all of the detectors (or alternatively may include more than one ADC but multiple detectors may share a single ADC instead of each individual detector being associated with its own ADC). That is, the second circuit configuration 420 may include the outputs of the detectors being provided as inputs to a single ADC. The ADC may then provide a digital output to the one or more signal processing components 410 as was the case in the first circuit configuration 400. However, the second circuit configuration 420 may also include one or more additional components between the detectors and the ADC. For example, the second circuit configuration 420 may include a summer subcircuit 422. The summer subcircuit 422 may receive the outputs from the one or more detectors and combine them into a single output. Prior to the summer may also exist one or more attenuators (for example, one attenuator for each detector output. An attenuator may be used to attenuate the output of a detector, which may be useful in a number of scenarios. For example, if all of the detectors are turned on at all times, the attenuators may be used to attenuate outputs of certain detectors at certain times. For example, the attenuation may be performed to attenuate the outputs of all of the detectors except one detector. For example, the one detector may correspond to a field of view in which it is expected return light from an emitted light pulse would currently be located. The attenuators may thus serve to reduce the amount of detector output noise that is provided the ADC and signal processing components 410. The attenuators may also be used in other ways as well. For example, all of the outputs of the detectors may be left unattenuated unless it is determined that it is desired to block the output of one or more detectors.

Illustrative Methods

FIG. 5 is an example method 500 in accordance with one or more example embodiments of the disclosure.

At block 502 of the method 500 in FIG. 5, the method may include emitting, by a light emitter of a LIDAR system, a first light pulse at a first time. Block 504 of the method 500 may include activating a first light detector and a second light detector, wherein a field of view of the first light detector includes a range closer to the light emitter than the field of view of the second light detector. Block 506 of the method 500 may include emitting, by the light emitter, a second light pulse at a second time. Block 508 of method 500 may include receiving return light by the second light detector at a third time. Block 510 of method 500 may include determining, based on the return light being detected by the second light detector, that the return light is based on the first light pulse.

In some embodiments, the photodetectors may be selectively "turned on" and/or "turned off" (which may similarly be referred to as "activating" or deactivating" a photodetector). "Turning on" a photodetector may refer to providing a bias voltage to the photodetector that satisfies a threshold voltage level. The bias voltage satisfying the threshold voltage level (for example, being at or above the threshold voltage level) may provide sufficient voltage to the photodetector to allow it to produce a level of output current based on light received by the photodetector. The output threshold voltage level being used and the corresponding output current being produced may depend on the type of photodetector being used and the desired mode of the operation of the photodetector. For example, if the photodetector is an APD, the threshold voltage level may be set high enough so that the photodetector is capable of avalanching upon receipt of light as described above. Similarly, if it is desired for the APD to operate in Geiger Mode, the threshold voltage level may be set even higher than if the APD were desired to operate outside of the Geiger Mode region of operation. That is, the gain of the photodetector when this higher threshold voltage level is applied may be much larger than if the photodetector were operating as a normal Avalanche Photodiode. Additionally, if the photodetector is not an APD, and operates in a linear mode of operation in which the output current produced based on a similar amount of detected light may be much lower than if the photodetector were an APD, then the threshold bias voltage may be lower. Furthermore, even if the photodetector is an APD, the threshold voltage level may be set below a threshold voltage level used to allow the APD to avalanche upon receipt of light. That is, the bias voltage applied to the APD may be set low enough to allow the APD to still produce an output current, but only in a linear mode of operation.

Likewise, in some embodiments, "turning off" a photodetector may refer to reducing the bias voltage provided to the photodetector to below the threshold voltage level. In some instances, "turning off" the photodetector may not necessarily mean that the photodetector is not able to detect return light. That is, the photodetector may still be able to detect return light while the bias voltage is below the threshold voltage level, but the output signal produced by the photodetector may be below a noise floor established for a signal processing portion of the LIDAR system. As one non-limiting example, a photodetector may be an Avalanche Photodiode. If a sufficient enough bias voltage is provided to allow the APD to avalanche upon receipt of light, then a large current output may be produced by the APD. However, if a lower bias voltage is applied, then the APD may still produce an output, but the output may be based on a linear mode of operation and the resulting output current may be much lower than if the APD were to avalanche upon receipt of a same number of photons. The signal processing portion of the LIDAR system may have a noise floor configured to correspond to an output of the APD in linear mode, so that any outputs from the APD when operating with this reduced bias voltage may effectively be disregarded by the LIDAR system. Thus, selectively turning on and/or turning off the photodetectors may entail only having some of the photodetectors capable of detecting return light at a given time.

Figure 6:
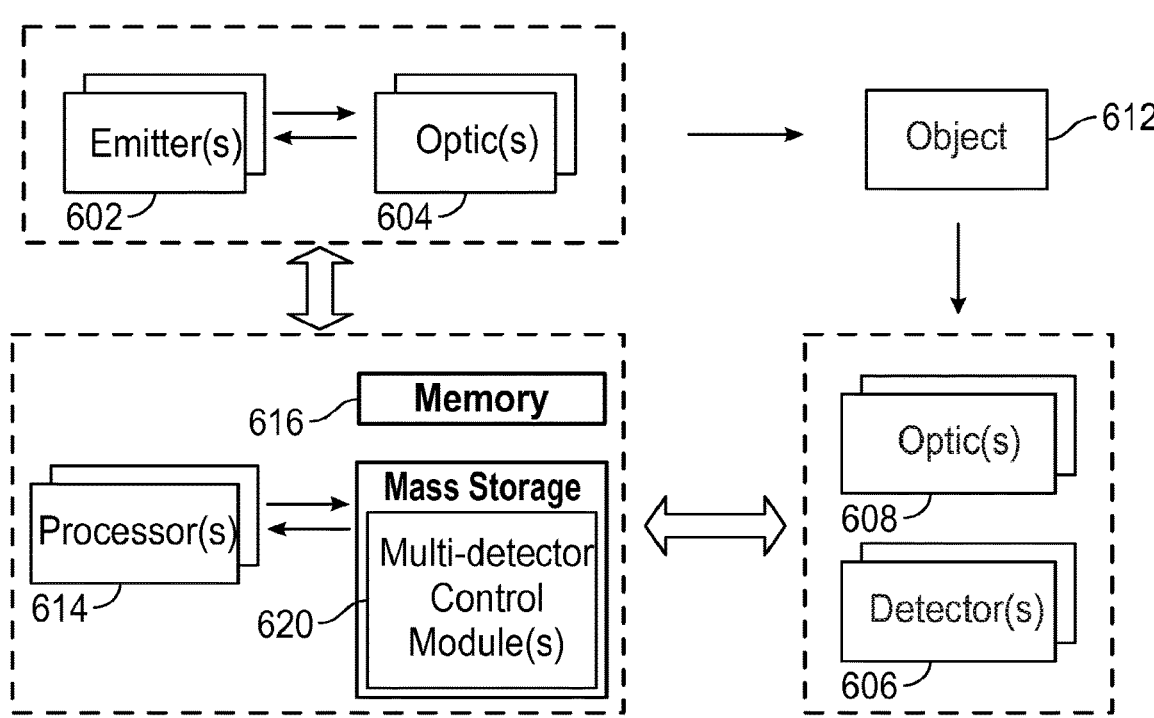
FIG. 6 depicts a schematic illustration of an example system architecture, in accordance with one or more example embodiments of the disclosure.

The operations described and depicted in the illustrative process flow of FIG. 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.
Example Lidar System Configuration FIG. 6 illustrates an example LIDAR system 600, in accordance with one or more embodiments of this disclosure. The LIDAR system 600 may be representative of any number of elements described herein, such as the LIDAR system 101 described with respect to FIG. 1, as well as any other LIDAR systems described herein. The LIDAR system 600 may include at least an emitter portion 601, a detector portion 605, and a computing portion 613.

In some embodiments, the emitter portion 601 may include at least one or more emitter(s) 602 (for simplicity, reference may be made hereinafter to "an emitter," but multiple emitters could be equally as applicable) and/or one or more optical element(s) 604. An emitter 602 may be a device that is capable of emitting light into the environment. Once the light is in the environment, it may travel towards an object 612. The light may then reflect from the object and return towards the LIDAR system 600 and be detected by the detector portion 605 of the LIDAR system 600 as may be described below. For example, the emitter 602 may be a laser diode as described above. The emitter 602 may be capable of emitting light in a continuous waveform or as a series of pulses. An optical element 604 may be an element that may be used to alter the light emitted from the emitter 602 before it enters the environment. For example, the optical element 604 may be a lens, a collimator, or a waveplate. In some instances, the lens may be used to focus the emitter light. The collimator may be used to collimate the emitted light. That is, the collimator may be used to reduce the divergence of the emitter light. The waveplate may be used to alter the polarization state of the emitted light. Any number or combination of different types of optical elements 604, including optical elements not listed herein, may be used in the LIDAR system 600.

In some embodiments, the detector portion 605 may include at least one or more detector(s) 606 (for simplicity, reference may be made hereinafter to "a detector," but multiple detectors could be equally as applicable) and/or one or more optical elements 608. The detector may be a device that is capable of detecting return light from the environment (for example light that has been emitted by the LIDAR system 600 and reflected by an object 612). For example, the detectors may be photodiodes. The photodiodes may specifically include Avalanche Photodiodes (APDs), which in some instances may operate in Geiger Mode. However, any other type of detector may be used, such as light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide the plurality of emitted light beams and/or pulses. Generally, the detectors of the array may take various forms. For example, the detectors may take the form of photodiodes, avalanche photodiodes (e.g., Geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. The functionality of the detector 606 in capturing return light from the environment may serve to allow the LIDAR system 600 to ascertain information about the object 612 in the environment. That is, the LIDAR system 600 may be able to determine information such as the distance of the object from the LIDAR system 600 and the shape and/or size of the object 612, among other information. The optical element 608 may be an element that is used to alter the return light traveling towards the detector 606. For example, the optical element 608 may be a lens, a waveplate, or filter such as a bandpass filter. In some instances, the lens may be used to focus return light on the detector 606. The waveplate may be used to alter the polarization state of the return light. The filter may be used to only allow certain wavelengths of light to reach the detector (for example a wavelength of light emitted by the emitter 602). Any number or combination of different types of optical elements 608, including optical elements not listed herein, may be used in the LIDAR system 600.

In some embodiments, the computing portion may include one or more processor(s) 614 and memory 616. The processor 614 may execute instructions that are stored in one or more memory devices (referred to as memory 616). The instructions can be, for instance, instructions for implementing functionality described as being carried out by one or more modules and systems disclosed above or instructions for implementing one or more of the methods disclosed above. The processor(s) 614 can be embodied in, for example, a CPU, multiple CPUs, a GPU, multiple GPUs, a TPU, multiple TPUs, a multi-core processor, a combination thereof, and the like. In some embodiments, the processor(s) 614 can be arranged in a single processing device. In other embodiments, the processor(s) 614 can be distributed across two or more processing devices (for example multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (for example manufactured) to perform the functions described herein.

The processor(s) 614 can access the memory 616 by means of a communication architecture (for example a system bus). The communication architecture may be suitable for the particular arrangement (localized or distributed) and type of the processor(s) 614. In some embodiments, the communication architecture 606 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 616 also can retain data.

Each computing device 600 also can include mass storage 617 that is accessible by the processor(s) 614 by means of the communication architecture 606. The mass storage 617 can include machine-accessible instructions (for example computer-readable instructions and/or computer-executable instructions). In some embodiments, the machine-accessible instructions may be encoded in the mass storage 617 and can be arranged in components that can be built (for example linked and compiled) and retained in computer-executable form in the mass storage 617 or in one or more other machine-accessible non-transitory storage media included in the computing device 600. Such components can embody, or can constitute, one or many of the various modules disclosed herein. Such modules are illustrated as multi-detector control modules 620.

The multi-detector control modules 620 including computer-executable instructions, code, or the like that responsive to execution by one or more of the processor(s) 614 may perform functions including controlling the one or more detectors as described herein. For example, turning on and/or turning off any of the detectors are described herein. Additionally, the functions may include execution of any other methods and/or processes described herein.

It should further be appreciated that the LIDAR system 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What is claimed is:

1. A method comprising:
  emitting, by a light emitter, a first light pulse at a first time;
  activating a first light detector and a second light detector with different fields of view;
  emitting, by the light emitter, a second light pulse at a second time;
  receiving return light by the first light detector or the second light detector at a third time; and
  determining, based on the return light being detected by the first light detector or the second light detector, whether the return light is based on the first light pulse or the second light pulse when the first light pulse and second light pulse are simultaneously traversing an environment for a period of time.

2. The method of claim 1, wherein a field of view of the first light detector includes a range closer to the light emitter than the field of view of the second light detector, and
  wherein determining whether the return light is based on the first light pulse or the second light pulse includes determining, based on the return light being detected by the second light detector, the return light is based on the first light pulse.

3. The method of claim 2, wherein activating the first light detector further comprises providing a first bias voltage to the first light detector, and
  wherein activating the second light detector further comprises providing a second bias voltage to the second light detector.

4. The method of claim 3, wherein the first bias voltage is provided to the first light detector at a fourth time and the second bias voltage is provided to the second light detector at a fifth time, the fourth time corresponding to a time at which return light based on the first light pulse would be within the field of view of the first light detector, and the fifth time corresponding to a time at which return light based on the first light pulse would be within the field of view of the second light detector.

5. The method of claim 2, wherein determining the return light is based on the first light pulse is further based on the first light detector being active at the third time.

6. The method of claim 2, wherein determining, based on the return light being detected by the first light detector or the second light detector, whether the return light is based on the first light pulse or the second light pulse further includes:
  determining second return light is detected by the first light detector at the third time; and
  determining, based on the second light detector detecting return light at the third time, the second return light detected by the first light detector is based on the second light pulse.

7. The method of claim 2, wherein the return light based on the first light pulse is detected by the second light detector prior to a detection of return light based on the second light pulse.

8. A non-transitory computer readable medium including computer-executable instructions stored thereon, which when executed by one or more processors of a wireless access point, cause the one or more processors to perform operations of:
  causing to emit, by a light emitter, a first light pulse at a first time;
  causing to activate a first light detector and a second light detector with different fields of view;
  causing to emit, by the light emitter, a second light pulse at a second time;
  determining return light is by the first light detector or the second light detector at a third time; and
  determining, based on the return light being detected by the first light detector or the second light detector, whether the return light is based on the first light pulse or the second light pulse when the first light pulse and second light pulse are simultaneously traversing an environment for a period of time.

9. The non-transitory computer readable medium of claim 8, wherein a field of view of the first light detector includes a range closer to the light emitter than the field of view of the second light detector, and
  wherein determining whether the return light is based on the first light pulse or the second light pulse includes determining, based on the return light being detected by the second light detector, the return light is based on the first light pulse.

10. The non-transitory computer readable medium of claim 9, wherein causing to activate the first light detector further comprises causing to provide a first bias voltage to the first light detector, and
  wherein causing to activate the second light detector further comprises causing to provide a second bias voltage to the second light detector.

11. The non-transitory computer readable medium of claim 10, wherein the first bias voltage is provided to the first light detector at a fourth time and the second bias voltage is provided to the second light detector at a fifth time, the fourth time corresponding to a time at which return light based on the first light pulse would be within the field of view of the first light detector, and the fifth time corresponding to a time at which return light based on the first light pulse would be within the field of view of the second light detector.

12. The non-transitory computer readable medium of claim 10, wherein determining the return light is based on the first light pulse is further based on a determination the first light detector is active at the third time.

13. The non-transitory computer readable medium of claim 9, wherein determining, based on the return light being detected by the first light detector or the second light detector, whether the return light is based on the first light pulse or the second light pulse further includes:

> determining second return light is detected by the first light detector at the third time; and
>
> determining, based on the second light detector detecting return light at the third time, the second return light detected by the first light detector is based on the second light pulse.

14. The non-transitory computer readable medium of claim 8, wherein the return light based on the first light pulse is detected by the second light detector prior to a detection of return light based on the second light pulse.

15. A system comprising:

> a light emitter configured to emit a first light pulse;
>
> a first light detector configured to point in a first direction and having a first field of view, the first field of view associated with a first range from the light emitter;
>
> a second light detector configured to point in a second direction and having a second field of view, the first field of view associated with a second range from the light emitter;
>
> a processor; and
>
> a memory storing computer-executable instructions, that when executed by the processor, cause the processor to:
>
> causing to emit, by a light emitter, a first light pulse at a first time;
>
> causing to activate a first light detector and a second light detector with different fields of view;
>
> causing to emit, by the light emitter, a second light pulse at a second time;
>
> determining return light is by the first light detector or the second light detector at a third time; and
>
> determining, based on the return light being detected by the first light detector or the second light detector, whether the return light is based on the first light pulse > or the second light pulse when the first light pulse and second light pulse are simultaneously traversing an environment for a period of time.

16. The system of claim 15, wherein a field of view of the first light detector includes a range closer to the light emitter than the field of view of the second light detector, and > wherein determining whether the return light is based on the first light pulse or the second light pulse comprises determining, based on the return light being detected by the second light detector, the return light is based on the first light pulse.

17. The system of claim 16, wherein causing to activate the first light detector further comprises causing to provide a first bias voltage to the first light detector, and > wherein causing to activate the second light detector further comprises causing to provide a second bias voltage to the second light detector.

18. The system of claim 17, wherein the first bias voltage is provided to the first light detector at a fourth time and the second bias voltage is provided to the second light detector at a fifth time, the fourth time corresponding to a time at which return light based on the first light pulse would be within the field of view of the first light detector, and the fifth time corresponding to a time at which return light based on the first light pulse would be within the field of view of the second light detector.

19. The system of claim 16, wherein determining the return light is based on the first light pulse is further based on a determination the first light detector is active at the third time, and > wherein the return light based on the first light pulse is detected by the second light detector prior to a detection of return light based on the second light pulse.

20. The system of claim 16, wherein determining, based on the return light being detected by the first light detector or the second light detector, whether the return light is based on the first light pulse or the second light pulse further includes:

> determining second return light is detected by the first light detector at the third time; and
>
> determining, based on the second light detector detecting return light at the third time, the second return light detected by the first light detector is based on the second light pulse.

* * * * *